C. G. SMITH.
SPRING WHEEL FOR VEHICLES.
APPLICATION FILED FEB. 28, 1912. RENEWED OCT. 20, 1913.
1,105,932.
Patented Aug. 4, 1914.
2 SHEETS—SHEET 1.
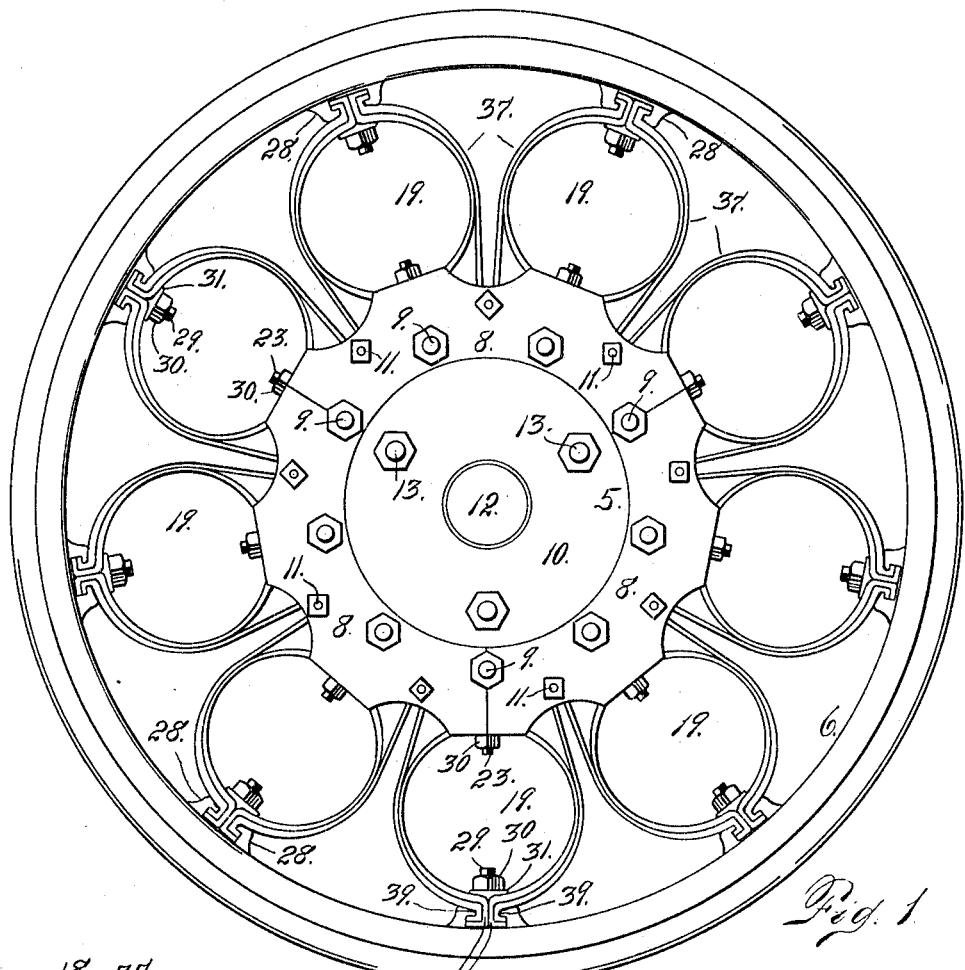
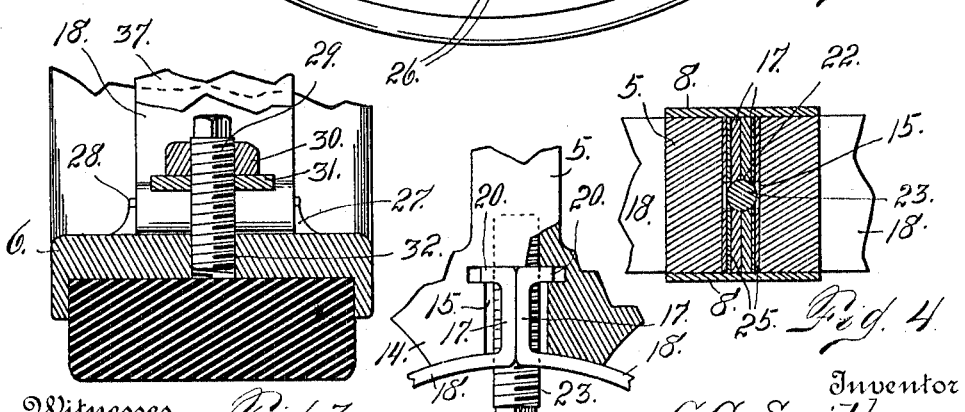
Witnesses
C. H. Rossener
Otto E. Hoddick
Inventor
C. G. Smith
Attorney

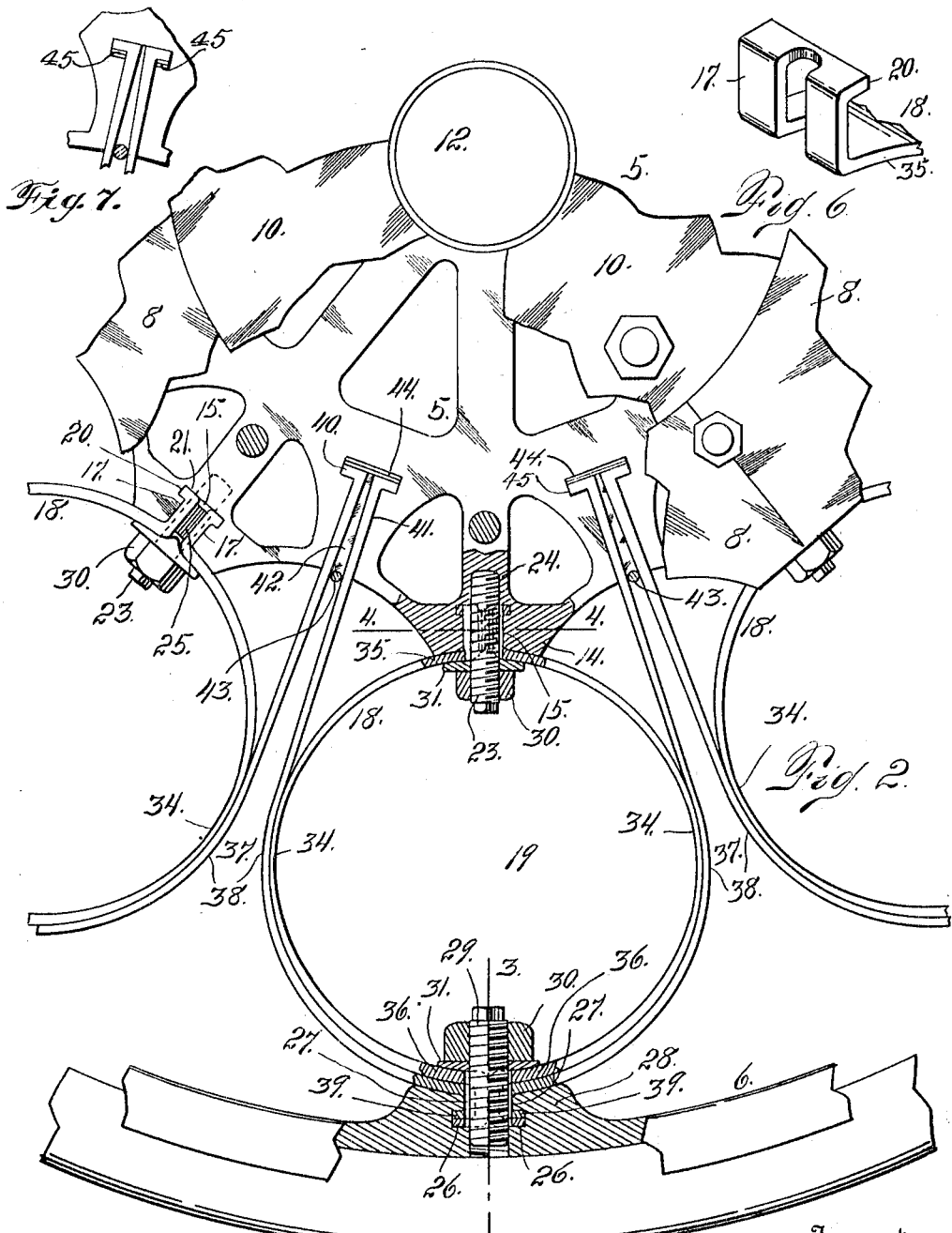

UNITED STATES PATENT OFFICE.

CICERO G. SMITH, OF PALISADE, COLORADO, ASSIGNOR TO SMITH SPRING WHEEL COMPANY, A CORPORATION OF ARIZONA.

SPRING-WHEEL FOR VEHICLES.

1,105,932. Specification of Letters Patent. Patented Aug. 4, 1914.

Application filed February 28, 1912, Serial No. 680,479. Renewed October 20, 1913. Serial No. 796,353.

*To all whom it may concern:*

Be it known that I, CICERO G. SMITH, citizen of the United States, residing at Palisade, county of Mesa, and State of Colorado, have invented certain new and useful Improvements in Spring-Wheels for Vehicles; and I do declare the following to be a full, clear, and exact description of the invention, such as will enable others skilled in the art to which it appertains to make and use the same, reference being had to the accompanying drawings, and to the characters of reference marked thereon, which form a part of this specification.

My invention relates to improvements in spring wheels for vehicles of the general construction set forth in my previous application, Serial Number 651,662, filed September 27, 1911. The construction is also similar to that set forth in a second application, Serial No. 680,480, filed February 28, 1912. In this style of wheel, I employ circular springs interposed between a relatively large hub and the rim of the wheel, the said circular springs being embraced on opposite sides by spoke springs, which conform to the curvature of the circular springs for a distance somewhat greater than one-half the circumference of the circular springs in the plane of the rim, the outer extremities of both sets of springs being anchored in contact with each other at the rim of the wheel, the inner extremities of the spoke springs, as well as the inner portions of the circular springs being secured to the hub of the wheel.

In my present improvement, the circular springs are each composed of two approximately semi-circular members, whose opposite extremities are respectively anchored in the hub and rim of the wheel. These semi-circular members of each circular spring vary in thickness, the spring members being thinnest mid-way between their extremities, and gradually increasing in thickness toward their extremities. By virtue of this construction, the wheels possess the necessary resilience with a light load; while when a heavy load is on the vehicle, the spring extremities, or the portions of the spring members which are comparatively thick, are brought into requisition, thus making the wheels approximately equally resilient, whether used with a light or heavy load. The spoke springs are also relatively thin intermediate their extremities, their relatively thin portions engaging the thin portions of their circular springs on the outside; and by virtue of this arrangement of the spoke and circular springs the latter are reinforced and supplemented in such a manner as to produce highly satisfactory results. From the relatively thin central portions of the spoke springs, the latter gradually increase in thickness toward both extremities.

Having briefly outlined my improved construction, I will proceed to describe the same in detail, reference being made to the accompanying drawing, in which is illustrated an embodiment thereof.

In this drawing:

Figure 1 is a side elevation of my improved spring wheel. Fig. 2 is a fragmentary view of the same, shown partly in section and on a larger scale. Fig. 3 is a section taken on the line 3—3, Fig. 2. Fig. 4 is a section taken on the line 4—4, Fig. 2, but showing the adjusting plate in a different position. Fig. 5 is a detail elevational view, partly in section, showing the circular springs in the adjustment indicated in Fig. 4. Fig. 6 is a detail perspective view of one extremity of a circular spring, and Fig. 7 is a detail side elevational view of the inner ends of a pair of spoke springs in an adjustment the reverse of that shown in Fig. 2.

The same reference characters indicate the same parts in all the views.

Let the numeral 5 designate the hub, and 6 the rim of the wheel. This hub is composed of a body member embraced on opposite sides by reinforcing plates, each composed of a number of members 8. These plates are secured to the body of the hub by bolts 9 and 11. The plate members 8 embrace the outer portion of the body of the hub, while integral disks 10 are centrally located, and also embrace the body member on opposite sides and immediately surrounding the hub opening 12. These disks are secured to the hub by bolts 13. The hub members are provided at regular intervals with exterior projections 14, which are recessed, as shown at 15, to receive the inner extremities 17 of the semi-circular members 18 comprising each circular spring 19. The openings 15 in the body of the hub member are of sufficient size to permit the insertion in a radial direction of the angle shaped spring extremities 17. These spring extremities are inserted one at a time. After the first one is introduced and moved outwardly to allow the outwardly turned extremity 20 to enter recesses 21 at the inner extremities of the openings 15, the other extremity of corresponding shape may be inserted and moved outwardly into a corresponding position. The central portions of the inner extremities of the circular spring members are cut away, as shown at 22, to permit the entrance of securing bolts 23 which pass through the openings 15 and are threaded into the body of the hub, as shown at 24. If it is desired that the extremities 17 of the circular spring members shall maintain their position of greatest separation, a separating slug, or plate, 25, is introduced between the extremities 17 of the spring members, as shown in Fig. 2. However, should it be desired to contract the circular springs by bringing their outer extremities nearer together, these separating slugs may be removed from their separating position, and the extremities of the springs pressed more closely together, in which event the slugs, or plates, are located outside the spring extremities, as shown in Fig. 4.

The outer extremities 26 of the circular spring members are approximately of the same shape as their inner extremities, and are applied laterally to openings 27 formed in bosses 28 projecting inwardly on the rim of the wheel. These spring extremities are also provided with centrally located openings into which the opposite sides of securing bolts 29 extend. The securing bolts 23 and 29 are held in place by nuts 30, screwed upon the bolts into engagement with washers 31. The securing bolts 29 are threaded into the rim of the wheel, entering threaded openings 32.

From the foregoing description it will be understood that even if the nuts 30 should be disengaged from their bolts, the latter would still maintain their positions for spring securing purposes.

The circular spring members 18 are thinnest mid-way between their extremities, as shown at 34. There is a central portion of each of these spring members which is practically of uniform thickness, being the thinnest portion of the spring. From these relatively thin portions 34 the circular spring members gradually increase in thickness toward both extremities, the relatively thick inner extremities of the springs being designated 35, and their relatively thick outer extremities as 36. These circular spring members are embraced on opposite sides by spoke springs 37, whose central portions 38 are relatively thin and embrace the relatively thin portions 34 of the circular spring members. From these thin central portions 38 of the spoke springs the latter increase in thickness toward both extremities thereof. The outer extremities 39 of these spoke springs are located in the openings 27 of the bosses 28, being shaped to conform to the corresponding extremities 26 of the circular spring members which they engage on the outside. The outer extremities of the spoke springs engage the circular spring members from the outer extremities of the latter inwardly toward the hub for a distance somewhat greater than half the circumference of the circular spring members, the inner extremities of the spoke springs being angle shaped, as shown at 40, and inserted laterally in openings 41 of corresponding shape formed in the body member of the hub, wedges 42 being interposed between the inner extremities of each pair of adjacent spoke springs. These wedges are locked in place against radial displacement by means of bolts 43, while they are prevented from lateral displacement by the plate members 8.

The inner extremities 40 of the spoke springs are adjustable to some extent within their openings 41 by means of plates, or slugs, 44 and 45. These plates 44 may be caused to engage the spoke spring extremities on their inner surfaces, while the parts, or slugs, 45 may be made to engage the respective extremities of each pair of adjacent spoke springs. In the one case, the extremities of the spoke springs are held outwardly from the center of the wheel, while in the other case, the same extremities are secured at their inward limit of movement. This feature permits adjustability of the spoke springs within considerable range, and compensates for slight possible variation of construction.

Having thus described my invention, what I claim is:

1. In a spring wheel, comprising a hub and rim, circular springs interposed between the hub and rim, each spring being composed of two members, the said members having radially bent extremities and the said hub and rim being provided with openings in which said extremities are anchored, and means for regulating the tension of said circular spring members comprising plates or slugs adapted to be employed to separate the said extremities or bring them nearer together.

2. In a spring wheel comprising a hub and rim, spring members interposed between the said hub and rim, said hub having openings in which the inner extremities of said spring members are anchored, said inner extremities having bent portions and plates or slugs adapted to be placed upon one or the other side of said bent portions to regulate the tension of the spring members.

3. A spring wheel for vehicles comprising a rim, a hub, circular springs interposed between the rim and hub and suitably anchored at diametrically opposite points, the said springs tapering from their extremities toward their central portions, which are reduced in thickness, and spoke springs embracing the circular springs on opposite sides, the said spoke springs having their extremities respectively anchored in the rim and hub, the spoke springs being thicker at their extremities and tapering toward their central portions, which are thinnest, the thin portions of the spoke springs engaging the corresponding portions of the circular springs, substantially as described.

4. A spring wheel for vehicles comprising a rim, a hub, circular springs interposed between the rim and hub, each spring being composed of two members, whose extremities are anchored in the rim and hub, the said spring members being thicker at their extremities and tapering toward their central portions, which are relatively thin, and means applied to the inner extremities of the circular spring members for regulating their tension, comprising plates, or slugs, adapted to be employed to separate the said extremities, or bring them nearer together, substantially as described.

5. A spring wheel for vehicles comprising a hub, a rim, circular springs interposed between the hub and rim, each spring being composed of two members, the said members having angle-shaped extremities, and the hub and rim being provided with openings in which said extremities are anchored, the said extremities being provided with central openings, securing bolts threaded into the rim and hub respectively, passing between the said extremities, their opposite sides being adapted to extend through the said openings in the extremities of the spring members, the said extremities being adjustable toward and away from each other, for the purpose of regulating their tension, and means for maintaining the spring extremities in the adjusted position, substantially as described.

6. A spring wheel for vehicles comprising a hub, a rim, the hub and rim having openings, circular springs interposed between the hub and rim, each spring being composed of two semi-circular members, whose extremities are anchored in the said openings, securing bolts placed between the extremities of the spring members, and threaded into the hub and rim, nuts and washers applied to the extremities of the bolts which extend into the space surrounded by the circular springs, the circular spring members having relatively thin portions intermediate their extremities, and spoke springs, whose extremities are anchored in the rim and hub respectively, said extremities being angle shape to facilitate anchorage, the spoke springs engaging the circular springs on opposite sides, and engaging the circular springs from their outer extremities for a distance somewhat more than half the circumference of the circular springs, the spoke springs having relatively thin intermediate portions engaging the corresponding portions of the circular spring members, and means for regulating the tension of the spoke springs, substantially as described.

7. A spring wheel for vehicles comprising a rim, a hub, circular springs interposed between the rim and the hub, each of said springs being composed of two semi-circular members whose opposite extremities are hook-shaped, and located in counterpart recesses formed in the rim and hub respectively, the said extremities of the spring members being perforated, and securing bolts inserted in the rim and hub respectively, passing between the hook-shaped extremities of the spring members and engaging the said perforations, substantially as described.

8. A spring wheel for vehicles comprising a rim, a hub, circular springs interposed between the rim and hub, each of said springs being composed of two semi-circular members, the extremities of the spring members being hook-shaped and engaging counterpart recesses formed in the rim and hub, securing bolts applied to the rim and hub passing between and engaging the extremities of the spring members for securing purposes, one set of extremities of the spring members being reinforced by engaging members adapted to be placed upon either side of the spring members for regulating the tension of the circular springs.

9. A spring wheel for vehicles, comprising a hub, circular springs interposed between the rim and the hub, each spring being composed of two semi-circular members whose extremities are anchored in the hub and rim, and spoke springs curved throughout a portion of their lengths adjacent their outer extremities concentrically with said circular springs, the curved portions of said spoke springs bearing upon and embracing said circular springs, the opposite extremities of the spoke springs being also anchored in the rim and hub, substantially as described.

In testimony whereof I affix my signature in presence of two witnesses.

CICERO G. SMITH.

Witnesses:
FRED. W. SLOTT,
HAVELOCK J. NORTHMORE.

Copies of this patent may be obtained for five cents each, by addressing the "Commissioner of Patents, Washington, D. C."